US006636235B1

(12) United States Patent
Cooper et al.

(10) Patent No.: US 6,636,235 B1
(45) Date of Patent: Oct. 21, 2003

(54) LETTERING ADJUSTMENTS FOR DISPLAY RESOLUTION

(75) Inventors: Michael Richard Cooper, Austin, TX (US); Rabindranath Dutta, Austin, TX (US); Lorin Evan Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 372 days.

(21) Appl. No.: 09/687,343

(22) Filed: Oct. 12, 2000

(51) Int. Cl.[7] .............................. G09G 5/00; G06F 15/00
(52) U.S. Cl. ....................................... 345/660; 715/500
(58) Field of Search ................................. 345/667, 668, 345/471, 472, 636, 660; 715/500

(56) References Cited

U.S. PATENT DOCUMENTS

| 4,675,830 | A | * | 6/1987 | Hawkins ...................... 345/666 |
| 4,684,935 | A | * | 8/1987 | Fujisaku et al. .............. 345/1.3 |
| 5,239,625 | A | * | 8/1993 | Bogart et al. ................ 345/428 |
| 5,485,563 | A | * | 1/1996 | Fisher .......................... 345/668 |
| 5,592,593 | A | * | 1/1997 | Speed .......................... 358/1.11 |
| 5,737,501 | A | * | 4/1998 | Tsunekawa .................. 358/1.2 |
| 5,737,619 | A |   | 4/1998 | Judson .......................... 707/500 |
| 5,754,873 | A | * | 5/1998 | Nolan .......................... 707/527 |
| 5,764,235 | A | * | 6/1998 | Hunt et al. ................... 345/428 |
| 5,781,714 | A | * | 7/1998 | Collins et al. ............... 345/471 |
| 5,784,047 | A | * | 7/1998 | Cahill et al. ................. 345/660 |
| 5,845,084 | A | * | 12/1998 | Cordell et al. ............... 709/234 |
| 5,952,994 | A | * | 9/1999 | Ong et al. .................... 345/668 |
| 6,006,257 | A |   | 12/1999 | Slezak .......................... 725/110 |
| 6,067,070 | A | * | 5/2000 | Suzuki et al. ................ 345/660 |
| 6,101,514 | A | * | 8/2000 | Chan ............................ 707/530 |
| 6,124,841 | A | * | 9/2000 | Aoyama ....................... 345/636 |
| 6,310,601 | B1 | * | 10/2001 | Moore et al. ................. 345/660 |
| 6,483,510 | B1 | * | 11/2002 | Jeong ........................... 345/467 |
| 6,492,994 | B2 | * | 12/2002 | Yokouchi ..................... 345/619 |
| 2001/0012051 | A1 | * | 8/2001 | Hara et al. ................... 348/14.01 |
| 2002/0091738 | A1 | * | 7/2002 | Rohrabaugh et al. ........ 707/517 |

* cited by examiner

*Primary Examiner*—Michael Razavi
*Assistant Examiner*—Ryan Yang
(74) *Attorney, Agent, or Firm*—David A. Mims, Jr.; Robert V. Wilder

(57) ABSTRACT

A method and implementing computer system are provided in which a request from a client for the display of a web page is processed by initially separating device-dependent display data from device-independent display data. The device-independent data is first sent back to the requesting client while the device-dependent data is being processed prior to being returned to the client. The device-dependent data processing includes separating bitmaps with text and bitmaps without text. The bitmaps are modified to suit the client system and the device-dependent modified bitmaps are returned to the client following the return of the device-independent data.

15 Claims, 5 Drawing Sheets

LETTERING ADJUSTMENTS FOR DISPLAY RESOLUTION

FIELD OF THE INVENTION

The present invention relates generally to information processing systems and more particularly to a methodology and implementation for enabling an optimized text presentation for text within an image file display.

BACKGROUND OF THE INVENTION

In networked computer systems, a plurality of computers are connected together and one or more of the computers generally performs the function of a network server. A network may be established through the hard-wired interconnection of a plurality of computer terminals in a local network or on a wider scale such as the Internet or World Wide Web (WWW) which may include telecommunication links. In any case, the network server acts as the central control unit for providing access to files, programs and program execution to the individual computers connected within the network. In general, a networked computer terminal will "logon" to the network and obtain access to a network server. The network server will download a homepage presentation on the user's terminal which may include audio and video effects. From the initial screen display, a user may designate any other "address" to get to another "location" or Web page screen display. The user may also select from a plurality of functions which may be presented for user selection on the initial display.

In general, a user who is operating a computer terminal can select the particular screen resolution of the user's display device. Screen resolutions can vary on computer screens. Typical resolutions are 160×160 for palm-held devices, 640×480 for VGA screen resolution, 800×600 for early SVGA screen resolution and 1600×1200 for a high resolution screen. Further, color depth can also vary in computer screens. Color selections include 2-bit gray scale, 16 colors, 256 colors and/or 24 or 32 bit color. Resolution and color selections can be chosen in many of the available computer operating systems. Thus a user may optimize screen resolution for the user's display device with regard to presentations made thereon, especially with regard to the user's needs. For example, programmers typically like high resolutions at low color depth while low resolution and high color depth would be preferred for video viewing.

Advertisements which are displayed at a user terminal from a remote Web site are generally downloaded in an image format. For example, so called "banner ads" are generally in a "gif" format. This creates a problem when text is contained as part of the displayed imagery. Since images typically are designed for one particular resolution, it is often the case that text that looks fine on 1600×1200 resolution screen may look unreadable and fuzzy on a 640×480 screen resolution. The reverse is also true. Thus there is a need to be able to adjust text associated with image files for a particular screen resolution of a user terminal. More broadly stated, there is a need to balance the display of content from heterogeneous sources on to users' screens which have differing screen resolutions.

SUMMARY OF THE INVENTION

A method and implementing computer system are provided in which a request from a client for the display of a web page is processed by initially separating device-dependent display data from device-independent display data. The device-independent data is first sent back to the requesting client while the device-dependent data is being processed prior to being returned to the client. The device-dependent data processing includes separating bitmaps with text and bitmaps without text. For bitmaps without text, the client resolution is obtained or estimated along with the original resolution for which each particular bitmap was designed. A tag is added to designate the originally designed resolution and the server scales the bitmap accordingly for the client device. For bitmaps with text, the string length of the text is determined and a tag is added specifying text overlaying bitmap and also the relative coordinates between the image and the text string start/stop positions. Adjustments are made so that the text fits inside the bitmap and the device-dependent data, including the modified bitmaps, are returned to the client following the return of the device-independent data.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
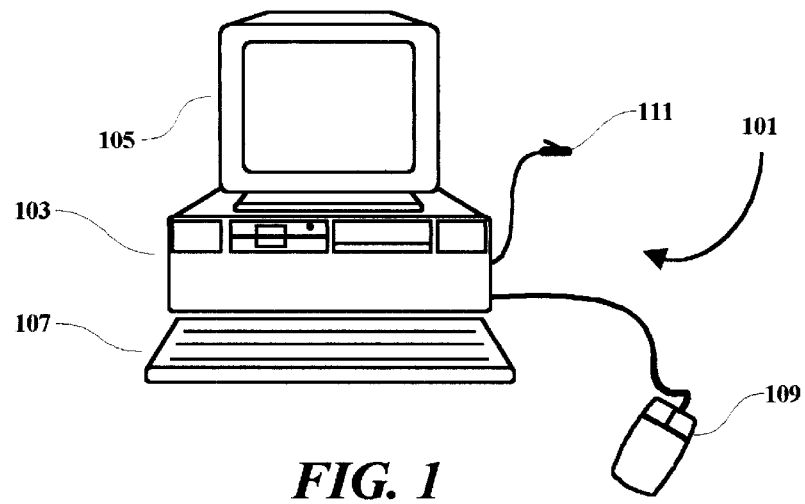
FIG. 1 is a diagram of a computer system in which the present invention may be implemented.

With reference to FIG. 1, the various methods discussed herein may be implemented within a computer network including a computer terminal 101, which may comprise either a workstation or a PC for example. In general, an implementing computer system may include computers configured with a plurality of processors in a multi-bus system in a network of similar systems. However, since the workstation or computer terminal 101 implementing the present invention in an exemplary embodiment, is generally known in the art and composed of electronic components and circuits which are also generally known to those skilled in the art, circuit details beyond those shown, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor or display unit 105, a keyboard 107 and a mouse or pointing device 109, which are all interconnected with the computer terminal illustrated. Also shown is a connector 111 which is arranged for connecting a modem within the computer terminal to a communication line such as a telephone line to access an Internet Service Provider (ISP) for example. The present invention may also be implemented in a cellular system.

Figure 2:
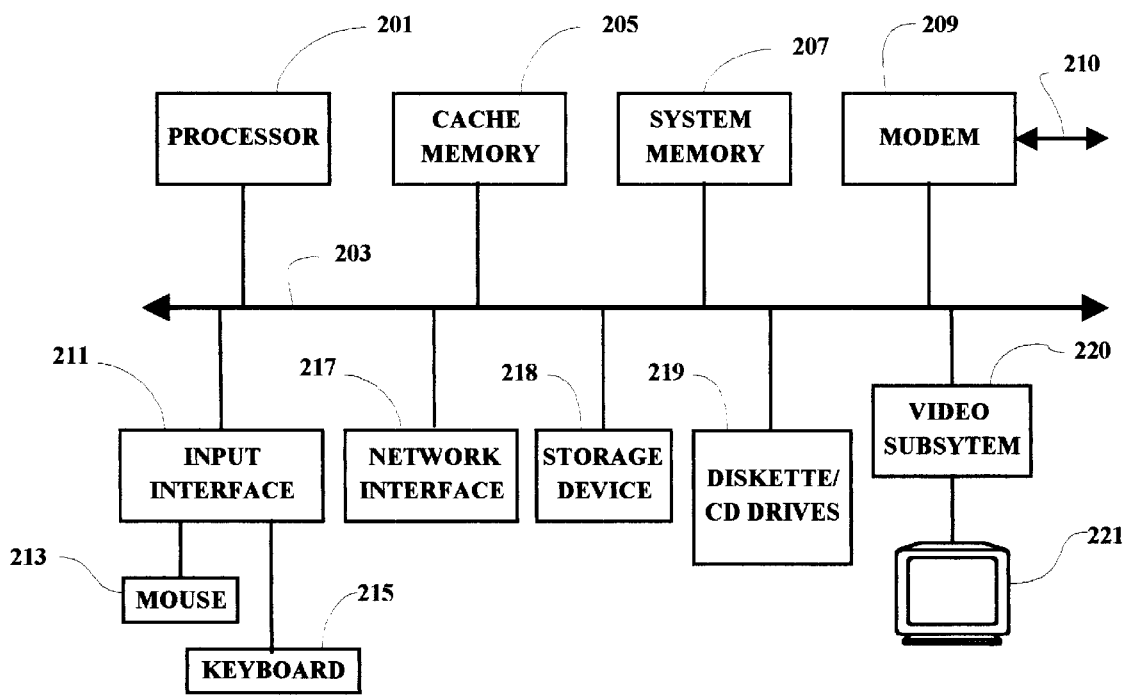
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with an ISP for example, to establish subsequent connections to selected Web sites. The system bus 203 is also connected through an input interface circuit 211 to a mouse or pointing device 213 and also to a keyboard 215. The bus 203 may also be coupled through a hard-wired network interface subsystem 217. A diskette and/or CD drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette/CD drive unit provides a means by which individual diskette/CD programs may be loaded into the system for selective execution by the computer terminal 101. As is well known, program diskettes/CDs containing application programs represented by indicia on the diskette/CD, may be read from the diskette/CD drive, and the computer system is selectively operable to read such indicia (e.g. magnetic or optical) and create program signals. Such program signals are selectively effective to cause the computer system to present displays on the screen of a display device and respond to user inputs in accordance with the functional flow of the application program being run.

In running an Internet access program or "browser" program on the computer terminal 101, the access program is typically stored in the storage device 218 and either selectively or automatically, partially or totally, loaded into the system memory 207 when the system is initially powered-on, or at a later time if so desired by a user. The browser is selectively operable to access selected Web sites.

Depending on specific program design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the browser program. In general, a user will make selections from a home page display screen using the keyboard 213 or the mouse or pointer device 215. Within the browser, the selections made by the user will determine "where" the user "goes", i.e. to what "site" or "Web page", and also, in some cases, the communications link or the path taken to get to the site selected.

Figure 3:
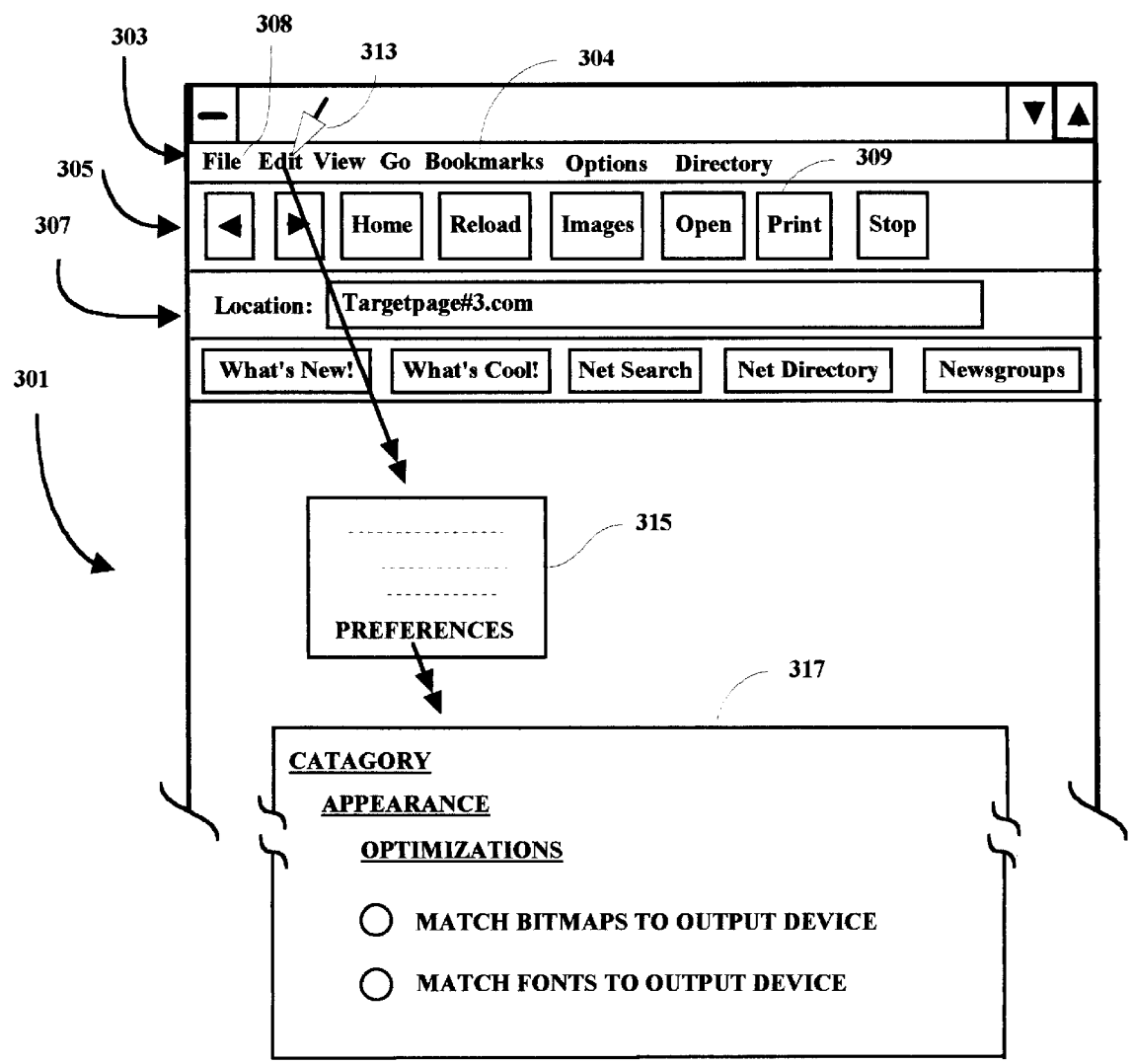
FIG. 3 is exemplary illustration of a Web page displayed within a browser application.

FIG. 3 illustrates a typical browser screen display 301 in an Internet operating session. The browser screen generally includes a function row 303 which displays several different functions which the user may select such as the "File" selection 308 or a "Bookmarks" selection 304. Another row 305 may be displayed to help a user quickly move through documents, sites, or pages in a network application. An address or "location" section 307 enables a user to key-in, and also displays, the name of an internet address of a site to be, or being, visited. In general, any of the illustrated items may be selected through a "point and click" methodology associated with the mouse device 213, and a cursor or pointer 313 visible on the display screen. For example, a download of data from a remote site may be immediately terminated during the transmission by pointing to the "Stop" button and clicking on a designated mouse button. Similarly, the "Back" and "Forward" buttons may be used to return to the last screen display or go forward to the next screen display, respectively. As illustrated in FIG. 3 in connection with one embodiment of the present invention, when the "Edit" function is actuated by the pointer 313, a sub-menu 315 is presented. By actuating a "Preferences" selection on the sub-menu 315, a second menu 317 is presented. The menu 317 may be used by a client in selecting specific default treatment for the display of documents which may be downloaded from a web site. As illustrated in the exemplary screen, an area for optimizations is designated to allow a user to select whether to match bitmaps received from a server to the user device or to match to the user device for fonts. The present invention provides a methodology for automatically processing display information in relation to a client or user's particular system such that relative proportions of downloaded images and text are optimized according to the client system.

Figure 4:
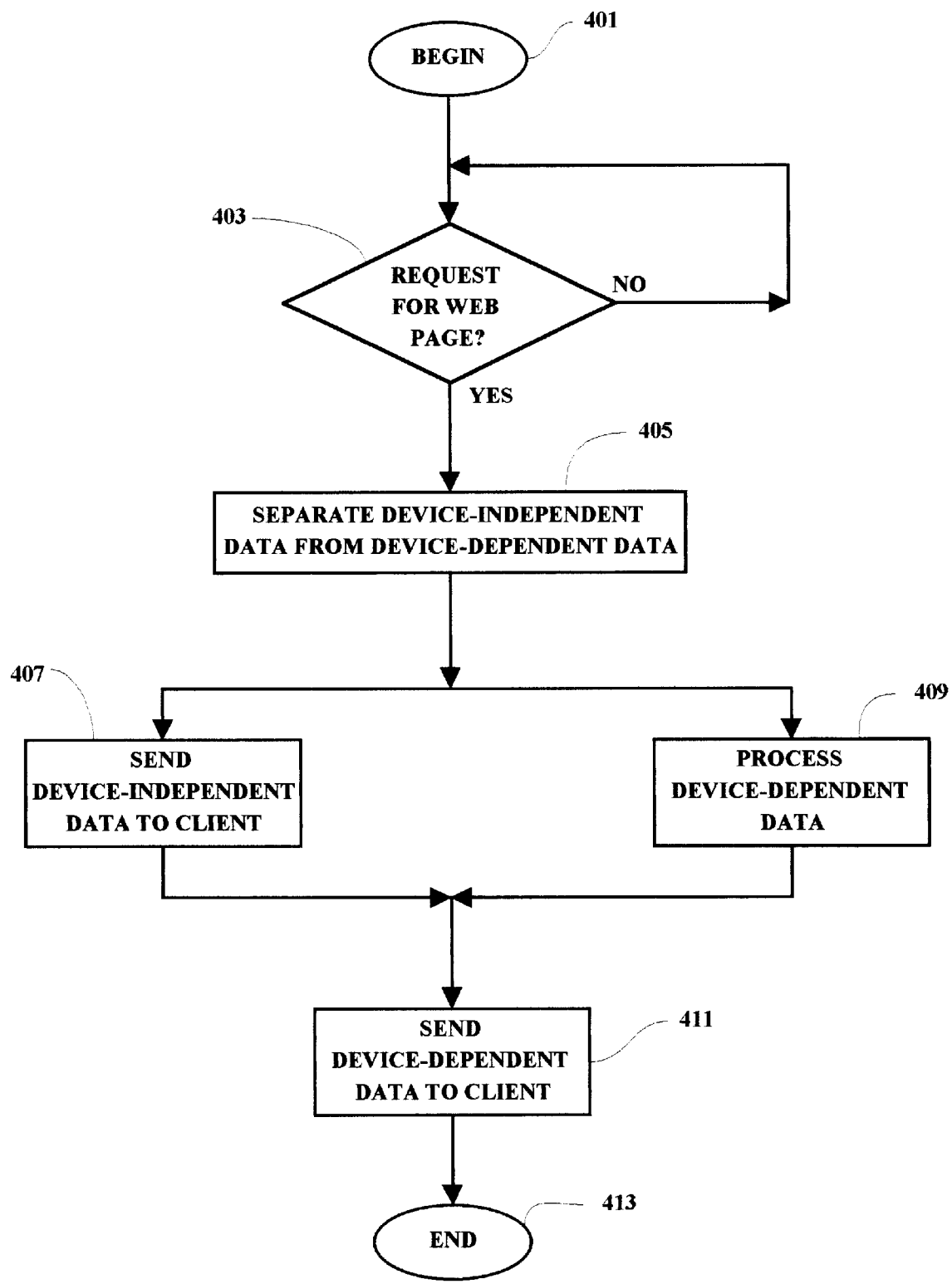
FIG. 4 is a flow chart illustrating an operational sequence in one exemplary embodiment of the methodology disclosed herein.

As shown in FIG. 4, the exemplary processing methodology begins 401 when a request for a web page is received 403 by a server from a client or user. Upon receipt of the request, the process separates device-dependent data from device-independent data 405.

Optionally, an extension to current markup languages is used to pre-format another version of the content with markup language tags used to specify where each type of data is found within the document. These new tags are used by the web browser to render the content optimized for the output device. For example:

```
<outputdeviceindependent>           // start of
outputdeviceindependent block
    (output device independent data is placed here)
    </deviceindependent>            // end of
outputdeviceindependent block
    <outputdevicedependent>         // start of
outputdevicedependent block
    (output device dependent data is placed here)
    </devicedependent>              // end of
outputdevicedependent block
```

Note that this process recognizes that it is impossible to optimize device dependent data in a generic, device independent mark-up languages such as HTML. Thus, generic mark-up language is transformed back into device dependent so that optimizations (parallelism and higher output quality in this case) can be made.

The device-independent data is sent to the requesting client 407 without modification for display. Scalable text fonts are considered device-independent and are sent along with the other device-independent data. In parallel, the device-dependent data, which has been separated out, undergoes further processing 409 to optimize the data with regard to the client's system, and the processed device-dependent data is then sent to the requesting client 411 (after the device-independent data has been sent) and the process ends 413.

Figure 5:
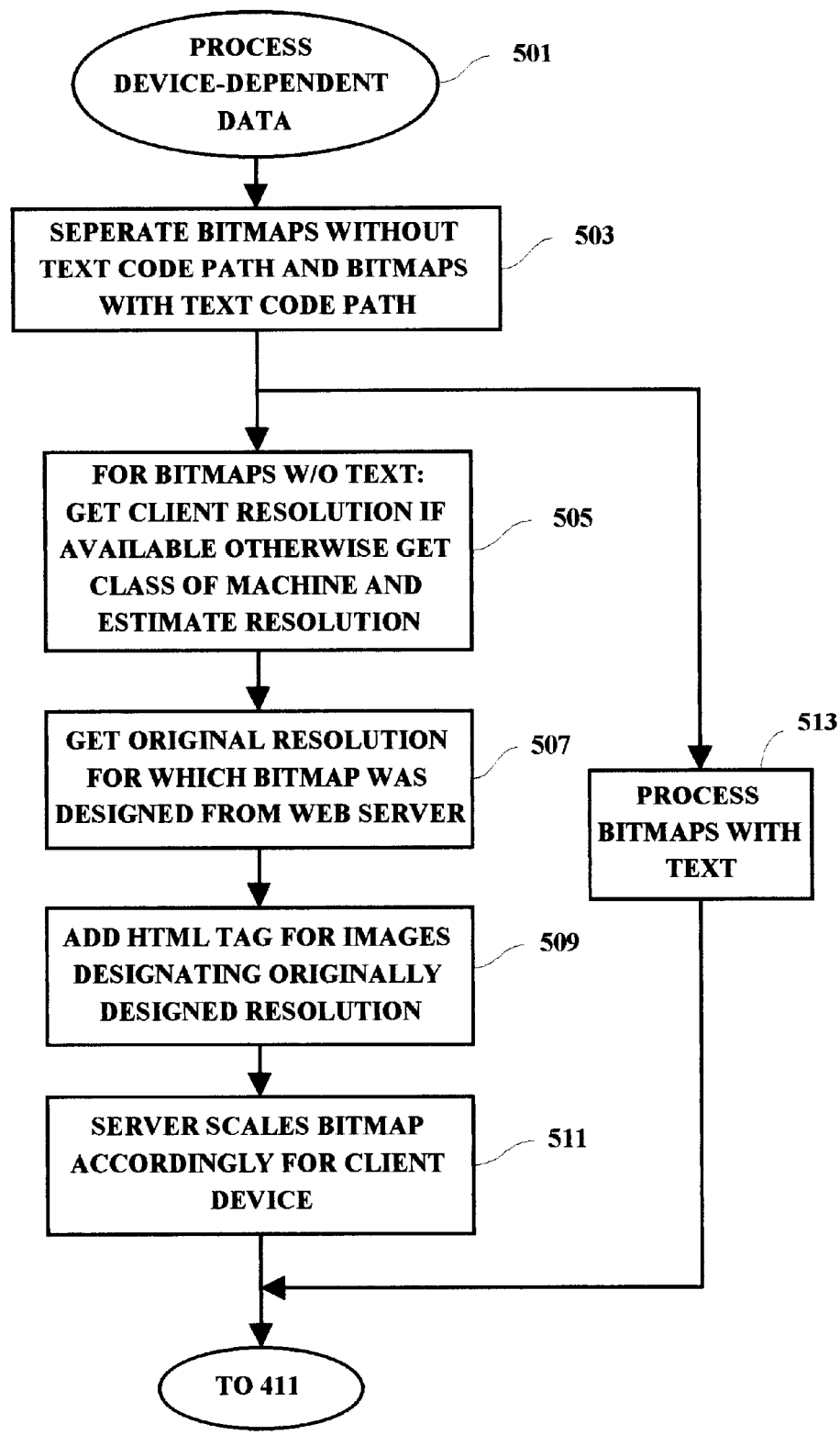
FIG. 5 is a flow chart illustrating an exemplary operational sequence for processing device-dependent data.

The device-dependent data processing step 409 is shown in more detail in FIG. 5. When processing begins 501, the bitmaps which contain non-scalable fonts are separated into bitmaps with text code paths and bitmaps without text code paths 503. Bitmaps with text code paths will be processed 513 separately from bitmaps without text code paths 505 before being returned to the requesting client 411. Bitmaps without text code paths are processed 505 by first getting the client resolution if it is available in a client file. If the client display resolution is not available, then the server gets the class of the client's machine and inserts a display resolution based on a reference such as a resolution database for example. Next, the server gets 507 the original resolution for which the bitmap was designed for display. This information may be obtained, for example, from the web server. Next an HTML (Hyper-Text Mark-up Language) tag for "gif" format images for example, is inserted 509 for images designating the originally designed resolution and the server scales the bitmap accordingly for the client device 511 before sending the modified device-dependent data back to the requesting client 411.

Figure 6:
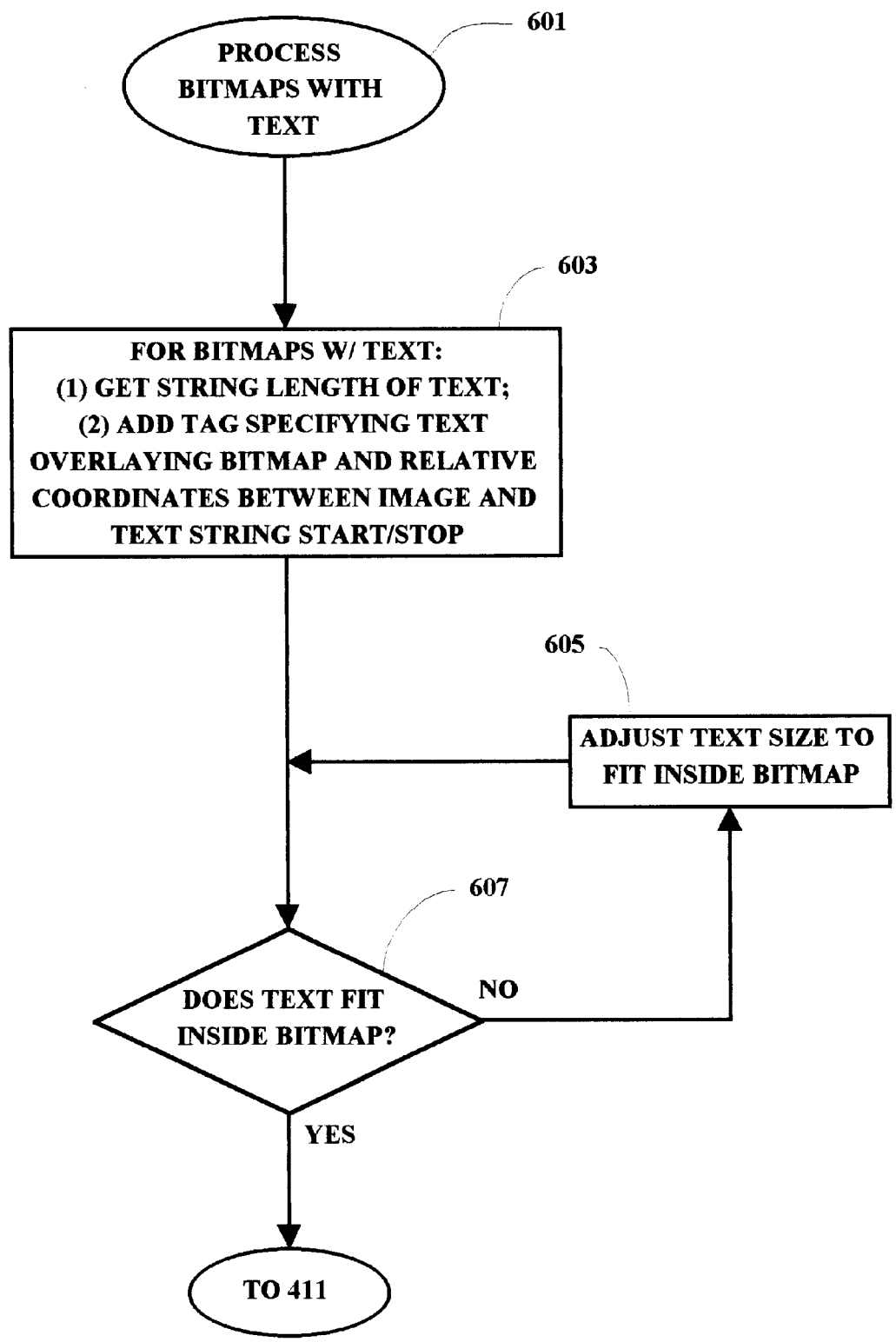
FIG. 6 is a flow chart illustrating an exemplary operational sequence for processing bitmaps which include text.

An exemplary methodology for processing for bitmaps with text is illustrated in FIG. 6. The processing begins 601 and obtains the string length of the text string being processed 603. A tag is added 603 which designates text overlaying bitmap and relative coordinates between image and the text string start and stop positions.

For example, tags such as shown below are used:

```
        <textwithinbitmap>        // specifies the start of text
within bitmap
block
        <texttooptimze>           // start of text
        </texttooptimze>          // end of text
        <bitmaptooptimze>         // start of bitmap
        </bitmaptooptimze>        // end of bitmap
        </textwithinbitmap>       // specifies end of text within
bitmap
block
```

A determination is next made 607 as to whether the text fits inside the bitmap and adjustments are made 605 to insure a proper fit. The modified bitmap with text is then sent back to the requesting client along with the other device-dependent data 411.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a display device request for screen display information, said screen display information containing device-dependent information and device-independent information, said method comprising:

separating said device-independent information from said device-dependent information;

sending said device-independent information to said display device;

processing said device-dependent information while said device-independent information is being sent to said display device, said processing including separating bitmaps without text code paths from bitmaps with text code paths; and separately processing said bitmaps without text code paths and said bitmaps with text code paths, said processing of said bitmaps with text code paths comprising obtaining string length of text string overlaying a first bitmap and adding a tag specifying said text string overlaying said first bitmap, said tag further specifying relative coordinates on said first bitmap of start and stop positions of said text string, said method further including sending said processed device-dependent information to said display device after sending said device-independent information.

2. The method as set forth in claim 1 wherein said processing of said bitmaps without text code paths comprises:

obtaining screen resolution for said display device;

obtaining original resolution for which each of said bitmaps without text code paths was designed;

adding a tag for images designating said original resolution; and scaling said bitmaps without text code paths in accordance with said display device resolution.

3. The method as set forth in claim 2, wherein said tag is in hyper-text mark-up language (HTML).

4. The method as set forth in claim 2 and further including obtaining a class of said display device and estimating said display device resolution if said display device resolution is not otherwise available.

5. The method as set forth in claim 2 wherein said original resolution is obtained from a server device.

6. The method as set forth in claim 2 wherein said scaling is accomplished by a server device.

7. The method as set forth in claim 1 and further including adjusting text string size to fit inside said bitmaps with text code paths.

8. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable to effect a processing of display device requests for screen display information, said screen display information containing device-dependent information and device-independent information, said program signals being selectively operable to accomplish the steps of:

separating said device-independent information from said device-dependent information;

sending said device-independent information to said display device;

processing said device-dependent information while said device-independent information is being sent to said display device, said processing including separating bitmaps without text code paths from bitmaps with text code paths; and separately processing said bitmaps without text code paths and said bitmaps with text code paths, said processing of said bitmaps with text code paths comprising obtaining string length of text string overlaying a first bitmap and adding a tag specifying said text string overlaying said first bitmap, said tag further specifying relative coordinates on said first bitmap of start and stop positions of said text string, said method further including sending said processed device-dependent information to said display device after sending said device-independent information.

9. The medium as set forth in claim 8 wherein said processing of said bitmaps without text code paths comprises:

obtaining screen resolution for said display device;

obtaining original resolution for which each of said bitmaps without text code paths was designed;

adding a tag for images designating said original resolution; and scaling said bitmaps without text code paths in accordance with said display device resolution.

10. The medium as set forth in claim 9 wherein said tag is in hyper-text mark-up language (HTML).

11. The medium as set forth in claim 9 and further including obtaining a class of said display device and estimating said display device resolution if said display device resolution is not otherwise available.

12. The medium as set forth in claim 9 wherein said original resolution is obtained from a server device.

13. The medium as set forth in claim 9 wherein said scaling is accomplished by a server device.

14. The medium as set forth in claim 8 and further including adjusting text string size to fit inside said bitmaps with text code paths.

15. A system comprising:

a server bus;

a CPU device connected to said server bus;

a memory device connected to said server bus;

a display device selectively coupled to said server bus, said system being selectively operable for processing requests from said display device for screen display information, said screen display information containing device-dependent information and device-independent information, said system being selectively operable in response to said requests for separating said device-independent information from said device-dependent information, said system being further operable for sending said device-independent information to said display device and processing said device-dependent information while said device-independent information is being sent to said display device, and sending said processed device-dependent information to said display device after sending said device-independent information.

* * * * *